J. D. RAMSEY.
COTTON SCRAPER.
APPLICATION FILED AUG. 13, 1920.
1,400,982.
Patented Dec. 20, 1921.
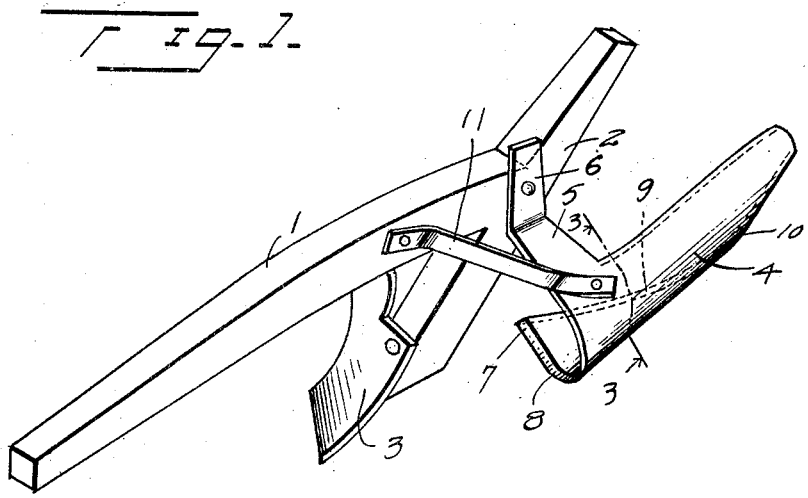
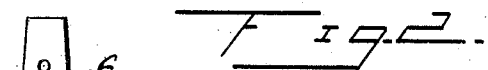
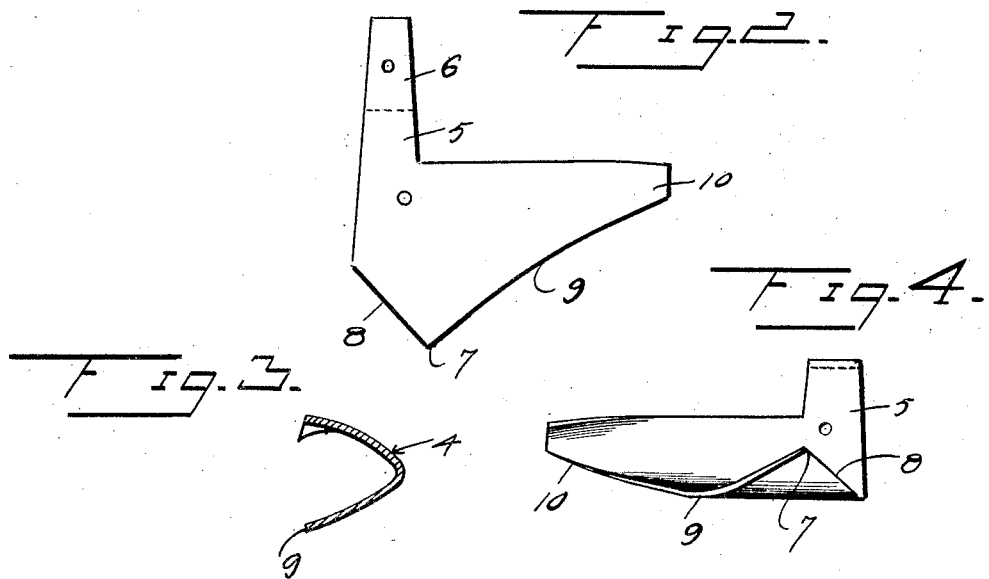
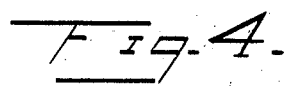
INVENTOR.
J. D. Ramsey
BY
ATTORNEY.

UNITED STATES PATENT OFFICE.

JAMES D. RAMSEY, OF TISHOMINGO, MISSISSIPPI.

COTTON-SCRAPER.

1,400,982.        Specification of Letters Patent.      Patented Dec. 20, 1921.

Application filed August 13, 1920. Serial No. 403,246.

*To all whom it may concern:*

Be it known that I, JAMES D. RAMSEY, a citizen of the United States, residing at Tishomingo, in the county of Tishomingo and State of Mississippi, have invented certain new and useful Improvements in Cotton-Scrapers; and I do hereby declare the following to be a full, clear, and exact description of the invention, such as will enable others skilled in the art to which it appertains to make and use the same.

This invention relates to a cotton scraper and it consists in the novel features hereinafter described and claimed.

An object of the invention is to provide a scraper in the form of an attachment adapted to be applied to a cotton cultivating plow and which may be used for effectually scraping the sides of the hills or the ridge adjacent the cotton plants as the plow is moved along the row during the cultivation of the crop.

An advantage gained by using an attachment of the character stated is that the weeds or vegetation adjacent the plants may be removed or destroyed at the time that the soil between the rows of plants is turned or cultivated.

With the above object in view, the cotton scraper comprises a scraper member formed from a blank of sheet material as for instance, sheet iron, and having a portion provided with converging or tapered edges, the said portion being curled transversely and provided at its forward end with a cutting edge and provided at its forward end with a point located at one end of the said cutting edge. The blank further includes an arm portion and a lug portion adapted to be secured to the side of the beam of the plow. A brace is employed for connecting the intermediate portion of the beam of the plow with the body portion of the scraper.

In the accompanying drawing:—

Figure 1 is a perspective view of a cotton cultivating plow with the scraper applied, Fig. 2 is a plan view of the blank of the scraper.

Fig. 3 is a cross-section on line 3—3 of Fig. 1, and

Fig. 4 is a side elevation of the scraper alone looking toward the open side thereof.

As illustrated in the accompanying drawings, the cotton cultivating plow comprises a beam 1 having a stock 2 applied to the rear end in a usual manner. A plow plate 3 is carried at the lower forward end of the stock 2. The scraper is indicated in general at 4. The scraper is formed from a blank of sheet material preferably iron and includes an arm portion 5 with an angularly disposed lug portion 6 which is adapted to be secured by bolts or other suitable securing devices to the side of the plow beam 1 and in the vicinity of the rear end thereof. The scraper member is provided at its forward end with a point 7 having a cutting edge 8 adjacent thereto. The lower edge 9 of the body of the member 4 is curved or curled inwardly whereby the point 7 is disposed at the forward end of the scraper and the edge 8 is disposed under the body of the scraper and extends from the point 7 rearwardly. The rear end 10 of the body of the scraper is adapted to travel upon the bottom of the furrow which is opened by the plow plate 3.

A brace 11 is connected at its forward end with the intermediate portion of the beam 1 and at its rear end with the forward portion of the body of the scraper 4.

In operation, the plate 3 opens a furrow between the rows of cotton plants and the edge 8 of the scraper moves along the side of the ridge or along the sides of the hills adjacent the cotton plants and cuts the vegetation therefrom. By reason of the transverse curl or curvature of the scraper, the vegetation which is cut from the hills or ridges is directed downwardly and into the bottom of the furrow which is opened by the plate 3 and is pressed into the same by the end portion 10 of the body of the scraper 4.

Having described the invention what is claimed is:—

1. A scraper attachment for agricultural implements consisting of an open blade substantially V-shaped at its forward edge and disposed with its opening facing the implement and the upper portion extending inwardly at a distance from the forward edge.

2. A scraper attachment for agricultural implements consisting of an open blade substantially V-shaped at its forward edge and disposed with its opening facing the implement, the blade having a substantially tapered lower portion widest at the front, attaching means extending from the upper portion of the blade and the upper portion extending rearwardly and inwardly beyond the lower portion.

In testimony whereof I affix my signature in presence of two witnesses.

JAMES D. RAMSEY

Witnesses:
J. H. FINCH,
H. C. LONG.